(12) United States Patent
Rousson et al.

(10) Patent No.: US 8,488,873 B2
(45) Date of Patent: Jul. 16, 2013

(54) METHOD OF COMPUTING GLOBAL-TO-LOCAL METRICS FOR RECOGNITION

(75) Inventors: Mikael Rousson, Cannes (FR); Jan Erik Solem, Bjärred (SE); Jerome Piovano, Juan les pins (FR)

(73) Assignee: Apple Inc., Cupertino, CA (US)

( * ) Notice: Subject to any disclaimer, the term of this patent is extended or adjusted under 35 U.S.C. 154(b) by 952 days.

(21) Appl. No.: 12/574,717

(22) Filed: Oct. 7, 2009

(65) Prior Publication Data

US 2011/0081074 A1 Apr. 7, 2011

(51) Int. Cl.
*G06K 9/62* (2006.01)
*G06K 9/00* (2006.01)

(52) U.S. Cl.
USPC .......................................... 382/159; 382/181

(58) Field of Classification Search
None
See application file for complete search history.

(56) References Cited

U.S. PATENT DOCUMENTS

| | | | | |
|---|---|---|---|---|
| 5,832,182 A * | 11/1998 | Zhang et al. | ..................... | 706/50 |
| 6,259,458 B1 * | 7/2001 | Theisen et al. | ................. | 345/440 |
| 6,363,334 B1 * | 3/2002 | Andrews et al. | .................. | 703/13 |
| 6,468,476 B1 * | 10/2002 | Friend et al. | ......................... | 506/9 |
| 6,496,208 B1 * | 12/2002 | Bernhardt et al. | ............. | 715/853 |
| 6,636,849 B1 | 10/2003 | Tang et al. | | |
| 6,751,343 B1 * | 6/2004 | Ferrell et al. | ................... | 382/145 |
| 7,177,295 B1 * | 2/2007 | Sholander et al. | ............. | 370/338 |
| 7,243,112 B2 * | 7/2007 | Qu et al. | ................................ | 1/1 |
| 7,519,200 B2 * | 4/2009 | Gokturk et al. | ................ | 382/118 |
| 7,536,064 B2 * | 5/2009 | Venkatesan et al. | ........... | 382/305 |
| 7,624,337 B2 * | 11/2009 | Sull et al. | ......................... | 715/201 |
| 7,657,100 B2 * | 2/2010 | Gokturk et al. | ................ | 382/209 |
| 7,813,531 B2 * | 10/2010 | Becker | ........................... | 382/115 |
| 7,823,055 B2 * | 10/2010 | Sull et al. | ........................ | 715/201 |
| 7,933,915 B2 * | 4/2011 | Singh et al. | .................... | 707/760 |
| 8,064,685 B2 * | 11/2011 | Solem et al. | ................... | 382/154 |
| 2008/0301133 A1 | 12/2008 | Brown et al. | | |
| 2009/0175509 A1 | 7/2009 | Gonion et al. | | |

OTHER PUBLICATIONS

Ramanan et al., "Local Distance Functions: A Taxonomy, New Algorithms, and an Evaluation", 2009 IEEE 12th International Conference on computer Vision (ICCV), 301-308, Kyoto, Japan, Sep. 2009.
Weinberger et al., "Distance Metric Learning for Large Margin Nearest Neighbor Classification", Advances in Neural Information Processing Systems 18, MIT Press, Cambridge, MA, pp. 1473-1480, 2006.
Domeniconi et al., "Locally Adaptive Metric Nearest-Neighbor Classification", IEEE Transactions on Pattern Analysis and Machine Intelligence, vol. 24, No. 9, pp. 1281-1285, Sep. 2002.

(Continued)

*Primary Examiner* — Manav Seth
(74) *Attorney, Agent, or Firm* — Blakely Sokoloff, Taylor & Zafman LLP

(57) ABSTRACT

A method of computing global-to-local metrics for recognition. Based on training examples with feature representations, the method automatically computes a local metric that varies over the space of feature representations to optimize discrimination and the performance of recognition systems. Given a set of points in an arbitrary features space, local metrics are learned in a hierarchical manner that give low distances between points of same class and high distances between points of different classes. Rather than considering a global metric, a class-based metric or a point-based metric, the proposed invention applies successive clustering to the data and associates a metric to each one of the clusters.

14 Claims, 2 Drawing Sheets

OTHER PUBLICATIONS

Hastie et al., "Discriminant Adaptive Nearest Neighbor Classification", IEEE Transactions on Pattern Analysis and Machine Intelligence, vol. 18, No. 6, pp. 607-616, Jun. 1996.

Davis et al., "Information-Theoretic Metric Learning", Proceedings of the 24th International Conference on Machine Learning, Corvalis, OR, pp. 209-216, Jun. 20-24, 2007.

Davis et al., "Information-Theoretic Metric Learning", retrieved from the Internet Jan. 21, 2001, http://doi.acm.org/10.1145/1273496.1273523, pp. 209-216, XP002617812 (2007).

Fu et al., "Locally adaptive subspace and similarity metric learning for visual data clustering and retrieval", Computer Vision and Image Understanding, Academic Press, vol. 110, No. 3, Jun. 1, 2008 (retrieved Dec. 23, 2007), pp. 390-402, XP022652947.

Authorized Officer Henriette Huysing-Solles, European Patent Office, International Search Report and Written Opinion in Application No. PCT/EP2010/064723, mailed Feb. 4, 2011, 13 pages.

* cited by examiner

METHOD OF COMPUTING GLOBAL-TO-LOCAL METRICS FOR RECOGNITION

BACKGROUND OF THE INVENTION

The classification problem can be formulated as a verification scheme where the objective is to determine if a pair of points is positive or negative, i.e. positive if the points belong to the same class, negative otherwise. Given a set of labeled data, one can try to learn the metric that gives a discriminative distance in a given feature space that would perform the best for this task; which is to give a low distance between points of a positive pair and a high distance to points of a negative pairs. A detailed overview of this type of methods can be found in [1].

Global metric learning has become popular to improve classification algorithms, such as the K-nearest neighbors (KNN) classification algorithm [2]. It often consists of estimating the optimal covariance matrix of the Mahanlobis distance that will be used for classification. While these kinds of global metrics have shown impressive improvements for classification, they do not capture local properties in the feature space which may be relevant for complex data distributions. To overcome this difficulty, a two step approach is generally employed [3, 4]. Firstly, a global metric is learned and training points in the feature space are transformed accordingly; secondly, a local metric is estimated in the neighborhood of each transformed training point. These local metrics allow for better adaptiveness to the data but often require an heuristic choice of locality.

The proposed invention is instead a hierarchical global-to-local approach, where the metric is iteratively refined and learned using the data distribution Itself. The approach starts by estimating a global metric and applying the corresponding (metric) transformation to the data. Then the transformed points are clustered to obtain a set of K clusters. These two steps are recursively applied to each cluster until a termination criterion is satisfied on the cluster. such criteria can be e.g. maximal height in the tree, minimal variance of the data points in the cluster or a minimum number of data points in the cluster. This forms a tree with a metric associated to each node.

DETAILED DESCRIPTION

Below follows a detailed description of the invention.

Given a set of labeled points $\{x_i, i=1 \ldots N\}$, we successively apply a global metric learning algorithm on sets of hierarchically clustered points. This has the effect of forming a metric tree. For simplicity of presentation, we assume the number of clusters for each instance of the clustering algorithm to be constant and equal to K. Let $n_{i,j}$ be the $j^{th}$ cluster at level i and $A_{i,j}$ be the associated metric transformation matrix. The metric is learned on the set of transformed points $\{y_{i,j} = \pi_{k=0}^{i-1} A_{i-1,j}/Kx_{i,j}\}$, e.g. using, but not restricted to, the Information Theoretic Metric Learning algorithm (ITML) proposed in [5].

Before applying the clustering algorithm to a node $n_{i,j}$, we apply the transformation associated to the metric of that to node the points given by its parents nodes.

We can now use our metric tree to evaluate the distance between any two data points, e.g. image descriptors, face feature vectors or other feature representations. First, each point is injected in the tree and its path is recovered. In particular, we identify the last node of the tree that contain both points. The distance between the points is then the one obtained using the metric associated to this node, possibly compounded with the metrics of parent nodes.

In the worst case, the last common node is the root of the tree, and therefore, the distance will use the global metric. The deeper in the tree the common node is, the more local the metric is. Compared to pure local or global methods, this approach has the advantage of refining the metric in dense or complex areas, according to the termination criterion (e.g. maximum leaf size, maximum leaf variance, maximum height limit).

A possible issue with this formulation is the high dependence on the clustering boundary. Points can be close to each other and separated quite early in the clustering tree. To reduce the influence of this decision, it is possible to construct multiple metric trees and average the distances given by each one of them.

In a preferred embodiment of the invention, a method for global-to-local metric learning is presented, the method comprising the steps of;
  learning a metric tree (as may be illustrated as in FIG. 1),
  classifying or comparing test data using this metric tree.

In another embodiment of the present invention, a computer program stored in a computer readable storage medium and executed in a computational unit for global-to-local metric learning comprising the steps of; learning a metric tree, classifying or comparing test points using this metric tree.

Yet another embodiment of the present invention, a system for global-to-local metric learning and classification containing a computer program for global-to-local metric learning comprising the steps of;
  learning a metric tree,
  classifying or comparing test data using this metric tree.

In another embodiment of the present invention a system or device is used for obtaining images, analyzing, and responding to results from classification using a global-to-local metric, as may be seen in FIG. 2. Such a system may include at least one Image acquisition device 101 and a computational device 100.

We have described the underlying method used for the present invention together with a list of embodiments. Possible application areas for the above described invention range from, but are not restricted to, object recognition and face recognition to classification of image content.

REFERENCES

Figure 1:
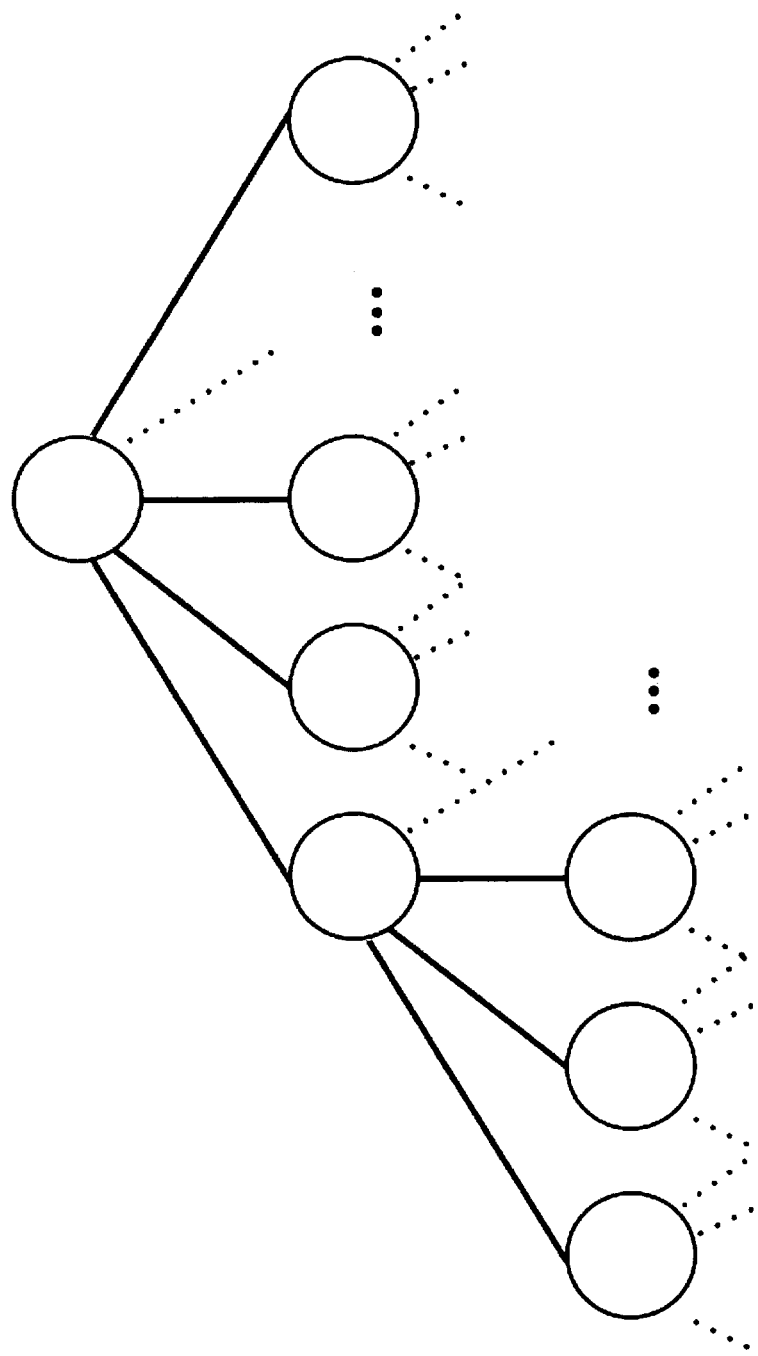
FIG. 1 illustrates a schematic layout of a global-to-local metric tree.
Figure 2:
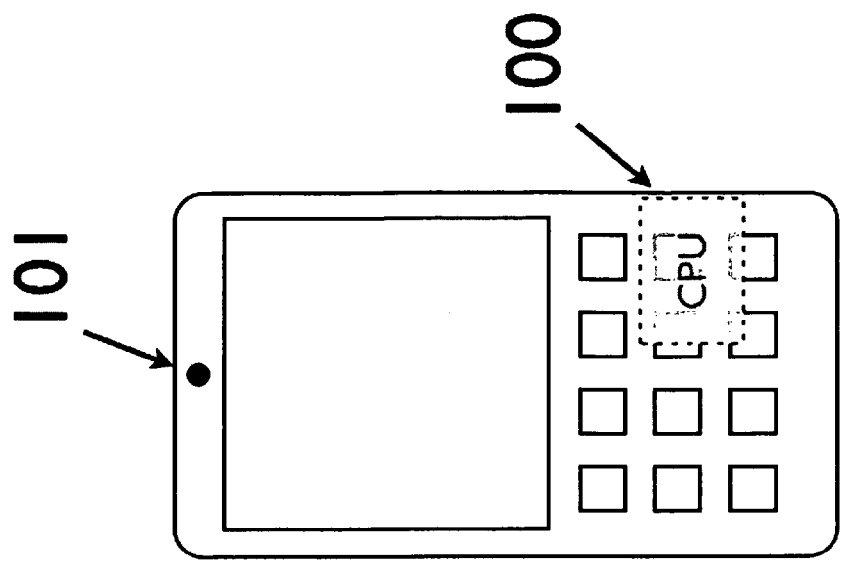
FIG. 2 illustrates systems comprising of a camera and computational unit using the global-to-local metric.
Figure 2:
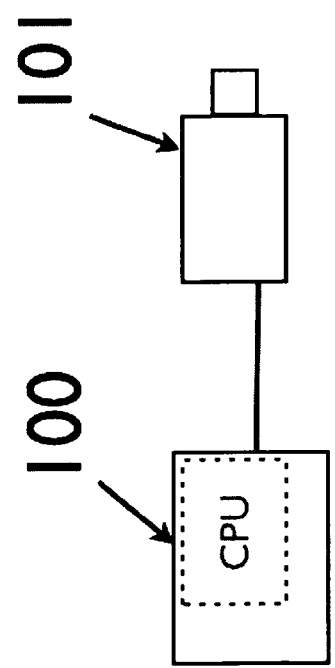

[1] D. Ramanan, S. Baker. "Local Distance Functions: A Taxonomy, New Algorithms, and an Evaluation" *International Conference on Computer Vision* (ICCV) Kyoto, Japan, September 2009.

[2] K. Weinberger, J. Blitzer, L. Saul. "Distance Metric Learning for Large Margin Nearest Neighbor Classification" *Advances in Neural Information Processing Systems* 18, MIT Press, Cambridge, Mass., pp. 1473-1480, 2006.

[3] C. Domeniconi and J. Peng and D. Gunopulos, "Locally Adaptive Metric Nearest Neighbor Classification" *IEEE Transactions on Pattern Analysis and Machine Intelligence*, vol. 24, pp. 1281-1285, 2002.

[4] T. Hastie, R. Tibshirani, "Discriminant Adaptive Nearest Neighbor Classification," *IEEE Transactions on Pattern Analysis and Machine Intelligence*, vol. 18, no. 6, pp. 607-616, June, 1996.

[5] J. V. Davis, B. Kulis, P. Jain, S. Sra, and I. S. Dhillon. "Information-theoretic metric learning" In *Proceedings of the 24th international Conference on Machine Learning*, Corvalls, Oreg., Jun. 20-24, 2007.

The invention claimed is:

1. A method for global-to-local metric learning for classification and recognition, the method comprising:
    in response to a set of hierarchically clustered points $\{x_i, I=1 \ldots N\}$, iteratively performing, by a processor, following operations:
        performing a global metric learning operation on the set of points to estimate a global metric, wherein the set of hierarchically clustered points is represented—using a tree structure constructed with a clustering algorithm at each level,
        for each of the points $\{x_i, I=1 \ldots N\}$, performing a transformation using a corresponding transformation matrix to generate transformed points $\{y_{i,j} = \pi_{k=0}^{i-1} A_{i-1,j}/Kx_{i,j}\}$, wherein K represents a number of clusters, wherein $A_{i,j}$ a transformation matrix, and
        clustering, using a clustering algorithm, the transformed points to generate a metric tree, wherein the global metric learning operation and transformation are performed until a termination criterion is satisfied, which is one of a maximum height in the metric tree, a minimal variance of data points in the metric tree, and a minimum number of data points the metric tree; and
    using the metric tree to evaluate an image for pattern recognition.

2. The method according to claim 1 wherein said clustering algorithm is the K-means clustering.

3. The method according to claim 1 wherein said metric is a symmetric matrix obtained with the ITML algorithm.

4. The method according to claim 1 wherein said clustering algorithm uses the local metric at each node.

5. A non-transitory machine-readable medium having instructions stored therein, which when executed by a processor, cause the processor to perform a method for global-to-local metric learning, the method comprising:
    and recognition, the method comprising:
    in response to a set of hierarchically clustered points $\{x_i, I=1 \ldots N\}$, iteratively performing, by a processor, following operations:
        performing a global metric learning operation on the set of points to estimate a global metric, wherein the set of hierarchically clustered points is represented using a tree structure constructed with a clustering algorithm at each level,
        for each of the points $\{x_i, I=1 \ldots N\}$, performing a transformation using a corresponding transformation matrix to generate transformed points $\{y_{i,j} = \pi_{k=0}^{i-1} A_{i-1,j}/Kx_{i,j}\}$, wherein K represents a number of clusters, wherein $A_{i,j}$ represents a transformation matrix, and
        clustering, using a clustering algorithm, the transformed points to generate a metric tree, wherein the global metric learning operation and transformation are performed until a termination criterion is satisfied, which is one of a maximum height in the metric tree, a minimal variance of data points in the metric tree, and a minimum number of data points the metric tree; and
    using the metric tree to evaluate an image for pattern recognition.

6. A medium according to claim 5, wherein the clustering algorithm is the K-means clustering.

7. A system, comprising:
    a processor; and
    a memory coupled to the processor for storing instructions, which when executed from the memory, cause the processor to perform operations, the operations including
        in response to a set of hierarchically clustered points $\{x_i, I=1 \ldots N\}$, iteratively performing, by a processor, following operations:
            performing a global metric learning operation on the set of points to estimate a global metric, wherein the set of hierarchically clustered points is represented using a tree structure constructed with a clustering algorithm at each level,
            for each of the points $\{x_i, I=1 \ldots N\}$, performing a transformation using a corresponding transformation matrix to generate transformed points $\{y_{i,j} = \pi_{k=0}^{i-1} A_{i-1,j}/Kx_{i,j}\}$, wherein K represents a number of clusters, wherein $A_{i,j}$ represents a transformation matrix, and
            clustering, using a clustering algorithm, the transformed points to generate a metric tree, wherein the global metric learning operation and transformation are performed until a termination criterion is satisfied, which is one of a maximum height in the metric tree, a minimal variance of data points in the metric tree, and a minimum number of data points the metric tree; and
        using the metric tree to evaluate an image for pattern recognition.

8. A system according to claim 7 where the feature representations represent objects in images.

9. A system according to claim 8 where the objects are faces.

10. The medium according to claim 5 wherein said metric is a symmetric matrix obtained with the ITML algorithm.

11. The medium according to claim 5 wherein said clustering algorithm uses the local metric at each node.

12. The system according to claim 7, wherein the clustering algorithm is the K-means clustering.

13. The system according to claim 7 wherein said metric is a symmetric matrix obtained with the ITML algorithm.

14. The system according to claim 7 wherein said clustering algorithm uses the local metric at each node.

* * * * *